United States Patent [19]

Shimoda

[11] Patent Number: 5,225,210
[45] Date of Patent: Jul. 6, 1993

[54] COLORED RESIN MOLDER

[75] Inventor: Toshio Shimoda, Tokyo, Japan

[73] Assignee: Sysko Corporation, Tokyo, Japan

[21] Appl. No.: 779,314

[22] Filed: Oct. 18, 1991

[51] Int. Cl.$^5$ ............................................. B29C 45/16
[52] U.S. Cl. .................................... 425/145; 264/40.4;
264/75; 366/76; 366/151; 425/170
[58] Field of Search .................. 366/76, 151, 152;
425/145, 169, 170; 264/40.4, 40.7, 73, 75, 77

[56] References Cited

U.S. PATENT DOCUMENTS

| | | | |
|---|---|---|---|
| 3,871,629 | 3/1975 | Hishida | 366/76 |
| 4,259,277 | 3/1981 | Hill | 264/75 |
| 5,110,521 | 5/1992 | Moller | 264/73 |

Primary Examiner—Tim Heitbrink
Attorney, Agent, or Firm—Wenderoth, Lind & Ponack

[57] ABSTRACT

A colored resin molder having a cylindrical input member, a resin material supply mechanism for storing a molding resin material having thermoplastic properties and supplying the stored resin material through the input member, a coloring agent supply device having a nozzle discharge end disposed in the input member for supplying a liquid coloring agent, a feeding mechanism for feeding the resin material from the resin material supply mechanism while mixing the coloring agent with the resin material for resin molding, a sensor device for detecting the status of the feeding by the feeding mechanism, and a control unit for controlling the operation of the coloring agent supply device according to the result of the detection by the sensor device.

4 Claims, 3 Drawing Sheets

F I G. 3
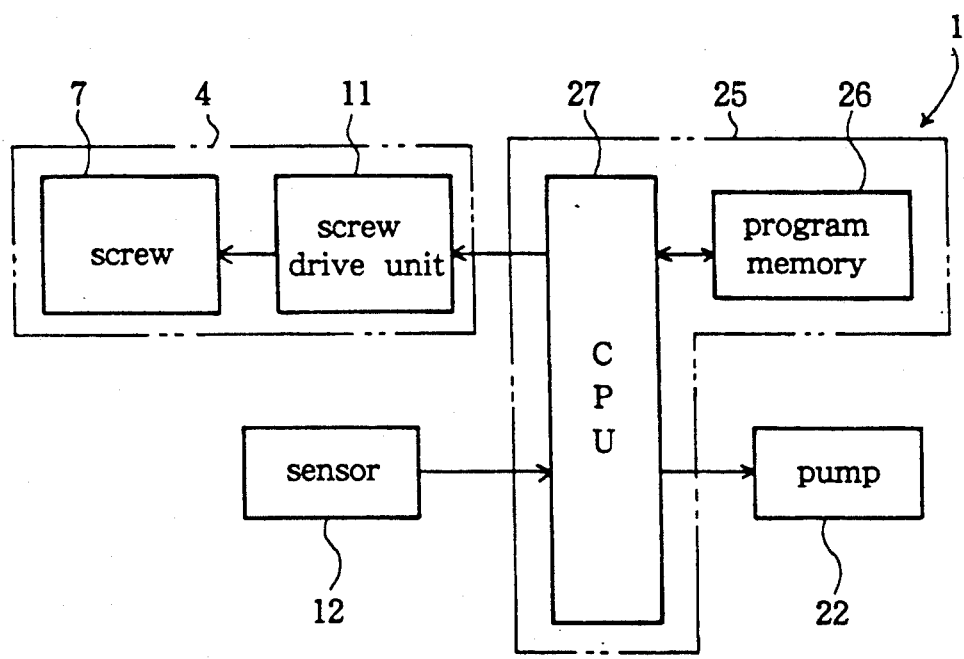

COLORED RESIN MOLDER

BACKGROUND OF THE INVENTION

1. Field of the Invention

This invention relates to colored resin molders and, more particularly, to a colored resin molder, which colors a molding material resin having thermoplastic properties by adding a liquid coloring agent to the resin and molding the colored resin thus obtained.

2. Description of the Related Art

A well-known molder for colored resins comprises a hopper for storing and issuing a resin material feeding means provided on the outlet side of the hopper and having a screw and a head for supplying the resin material fed by the feeding means to a dye while compressing the resin.

When this prior art molder is used to obtain a colored molding by coloring the resin material with a coloring agent, the resin material and coloring agent are usually mixed in the hopper. This means that after the molding operation using a coloring agent the hopper and feeding means must be cleaned to remove the remaining coloring agent if a molding operation using a different coloring agent is to be performed subsequently. The cleaning of the hopper and feeding means is very cumbersome and involves a great deal of labor.

In another aspect, with the above prior art molder it is difficult to stringently control the time and ratio of mixing of the resin material and the coloring agent. This means that it is impossible to obtain colored resins satisfactorily corresponding to the kind, size, color shade, etc. of desired molded products.

SUMMARY OF THE INVENTION

In the light of the above circumstances, the present invention has as its object to provide colored resin molder which can very readily permit changing of colors and also obtain colored resins best suited to molding products of various kinds and colors to be produced.

According to one mode of the invention, there is provided a colored resin molder, which comprises a material resin supply means for storing a molding, resin material having thermoplastic properties and issuing the stored resin material, a cylindrical member, through which the material resin from the material resin supply means is fed, coloring agent supply means having a nozzle discharge end disposed in the cylindrical member for supplying a liquid coloring agent, feeder means for feeding the resin material from the material resin supply means while mixing the coloring agent with the resin material for resin molding, sensor means for detecting the status of feeding by the feeding means, and means for controlling the operation of the coloring agent supply means according to an output of the sensor means.

According to another mode of the invention, the control means controls the coloring agent supply means so as to provide a suction force to the nozzle of the coloring agent supply means when the sensor means detects a stationary state of the feeder means.

According to a further mode of the invention, the control means controls the driving of the coloring agent supply means in synchronism with a feeding status of the feeder means as detected by the sensor means.

According to a still further mode of the invention, the control means controls the coloring agent supply means such that a predetermined quantity of the coloring agent is supplied at a constant rate during feeding by the feeder means as detected by the sensor means.

According to a yet further mode of the invention, the control means controls the coloring agent supply means such that when the sensor means detects the start of operation of the feeder means the start of operation of the coloring agent supply means is delayed for a predetermined period of time according to the result of the detection.

According to a yet another mode of the invention, the control means controls the coloring agent supply means according to the result of detection by the sensor means so as to stop the operation of the coloring agent supply means before the feeder means is stopped.

In the above first mode of the invention, the molding resin material having thermoplastic properties as supplied from the resin material supply means is fed through the cylindrical member to the feeder means.

At this time, the control means, controls the operation of the coloring agent supply means according to the result of detection by the sensor means, which detects the status of feeding by the feeder means. With this control, the coloring agent is supplied from the nozzle of the coloring agent supply means to the cylindrical member, and the material resin and coloring agent are mixed together by the feeder means to obtain a colored resin for resin molding.

In the above second mode of the invention, when the sensor means detects a stationary state of the feeder means, a suction force is provided to the nozzle of the coloring agent supply means under control of the control means. Thus, an excess amount of coloring agent can be prevented from being mixed with the resin material.

In the above third mode of the invention, the coloring agent supply means supplies the coloring agent in synchronism with the operation of the feeder means. It is thus possible to obtain optimum proportions of the resin material and coloring agent at all times.

In the above fourth mode of the invention, a predetermined amount of the coloring agent is supplied at a constant rate from the coloring agent supply means while the resin material is fed by the feeder means. Thus, it is possible to obtain a desirably colored resin.

In the above fifth mode of the invention, the coloring agent supply means supplies the coloring agent after the lapse of a predetermined period of time from the detection of the start of the feeder means by the sensor means. It is thus possible to obtain a colored resin having subtle variations in color.

According to the above sixth mode of the invention, the supply of the coloring agent is discontinued before the end of the feeding of the colored resin by the feeder means. It is thus possible to obtain a subtle color variation of a trailing portion of the colored resin.

BRIEF DESCRIPTION OF THE DRAWINGS

The above and other objects and features of the invention will become more apparent from the following description when the same is read with reference to the accompanying drawings, in which:

FIG. 3 is a block diagram showing a control system for the molder of the invention.

DETAILED DESCRIPTION OF THE PREFERRED EMBODIMENTS

Figure 1:
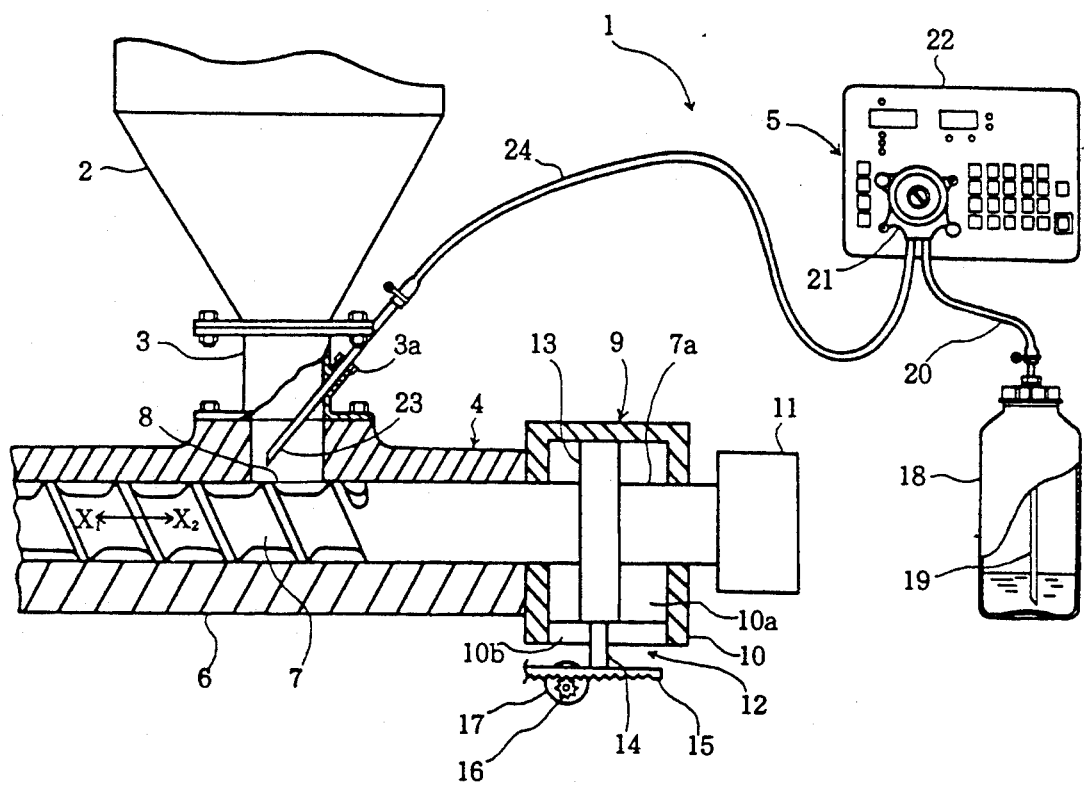
FIG. 1 is a schematic front view, partly in section, showing an embodiment of the molder according to the invention.

FIG. 1 shows a colored resin molder 1 embodying the invention. The illustrated molder comprises a hopper 2, a cylindrical bracket 3, a resin feeder 4 and a coloring agent feeder 5. The hopper 2 serves as a resin material feeder means, and it stores a molding resin material (in the form of particles) having thermoplastic properties and issues the stored resin from an outlet provided at the lower end. The bracket (or input member) 3 extends vertically and is connected by a flange to the outlet of the hopper 2. The resin feeder 4 is communicated with the bracket 3. The coloring agent feeder 5 supplies liquid coloring agents of various colors such as red, purple, yellow and blue to the bracket 3.

The resin feeder 4, as shown in FIG. 1, includes a horizontally extending cylinder 6 coupled to the lower end of the bracket 3, a screw 7 fitted for rotation and sliding in axial directions $X_1$ and $X_2$ in the cylinder 6, a hole 8 formed in the wall of the cylinder 6 and communicated with the bracket 3, a screw drive unit 9 provided on one end of the cylinder 6 and a head (not shown) provided on the other end of the cylinder 6 and having a well-known construction.

The screw drive unit 9 includes a box-like guide frame 10 provided on one end of the cylinder 6 and a screw driver 11 coupled to the end of the stem portion 7a of the screw 7 for imparting to the screw 7 a torque and a force to cause the sliding of the screw in the directions of arrows $X_1$ and $X_2$. The stem portion 7a of the screw 7 extends through the frame 10.

The screw drive unit 9 has a sensor 12 for detecting the sliding position of the screw 7 in the directions $X_1$ and $X_2$.

The sensor 12 has a guide piece 13, which projects from the stem portion 7a of the screw 7 in the guide space 10a in the guide frame 10 so as to be in contact with the upper and lower ends of the guide space 10a, a projecting piece 14, which has one end coupled to the guide piece 13 and has its other end portion extending downwardly through a slide groove 10b provided in the guide frame 10 a rack 15 supported by the projecting piece 14, a pinion 16 meshing with the rack 15 and a potentiometer 17 interlocked with the pinion 16.

The sensor 12 supplies to a controller 25 (to be described later) an output signal of the potentiometer 17, i.e., a detection signal corresponding to the rotational angle of the pinion 16, which is rotated upon displacement of the guide piece 13 and rack 15 due to the screw 7 being driven in the directions $X_1$ and $X_2$.

The structure of the screw 7 in the molder and related structure of the screw 7 of the resin feeder 4 and sensor 12 are not limited to that shown in FIG. 1.

Figure 2:
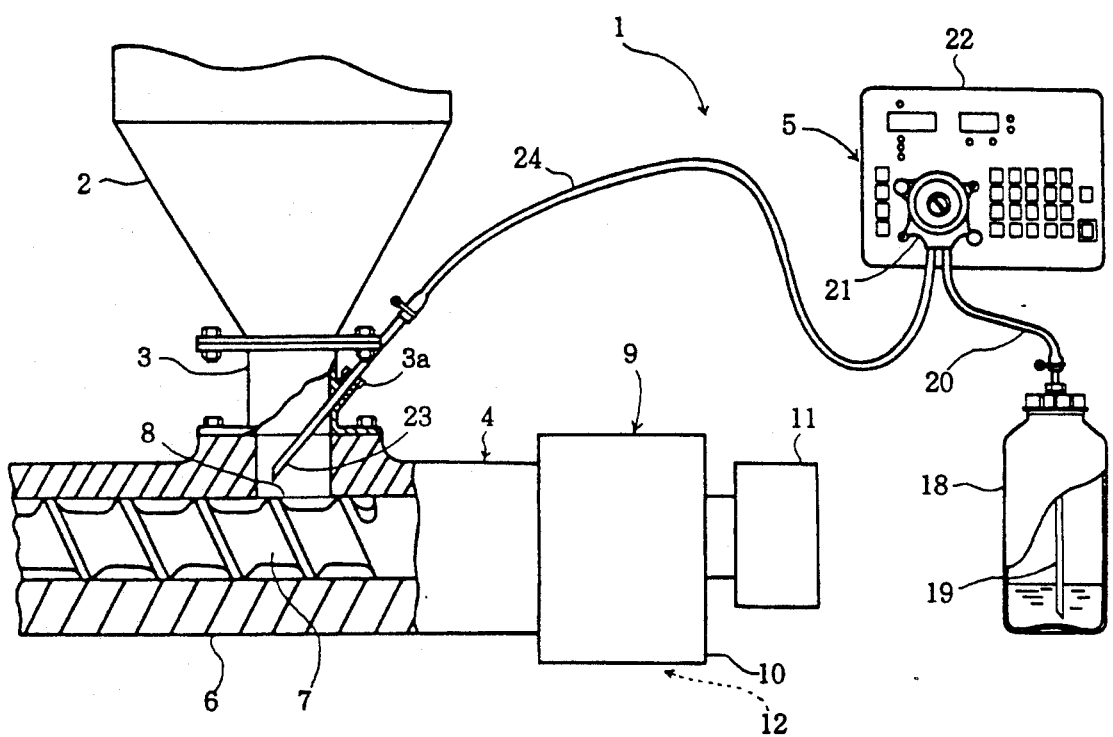
FIG. 2 is a view similar to FIG. 1 but showing a different embodiment of the invention.

For example, as shown in FIG. 2, the screw 7 of the resin feeder 4 may be fitted for rotation in cylinder 6 only. Where the screw 7 is constructed in this way, the screw drive unit 11 provides only torque to the screw 7. Thus, the detection in sensor 12 corresponds to the rotation of the screw 7, and a detection signal corresponding to the rotation, i.e., the output signal, is supplied to the controller 25 (to be described later).

The coloring agent feeder 5, as shown in FIG. 1, includes a container 18 accommodating a liquid coloring agent, a withdrawal tube 20 communicated with a withdrawal nozzle 19 provided in the container 18, a pump 22 having a pump head 22 connected to the discharge end of the withdrawal tube 20, a discharge nozzle 23 inserted through a nozzle receiver 3a provided obliquely in the wall of the bracket 3 and a feed tube 24 communicating with the pump head 21 and discharge nozzle 23. The lengths of the withdrawal tube 20 and feed tube 24 may, of course, be adjusted.

A control system for the colored resin molder 1 will now be described with reference to FIG. 3.

The control system includes a controller 25 for controlling the entire molder. The controller 25 includes a program memory 26, in which are stored operation programs for controlling the entire molder according and a CPU 27 for controlling the entire molder according to the programs.

Among the operation programs is a program for causing the pump 22 to perform an operation in which a suction force is imparted to the discharge nozzle 23 according to the detection signal from the sensor 12, a program for driving the pump 22 in synchronism with the feeding by the resin feeder 4, i.e., with rotation and sliding of the screw 7, a program for driving the pump 22 at a constant speed and for a constant period of time, a program for delaying the start of the pump 22 for a predetermined period of time (i.e., about several seconds) and a program for stopping the pump 22 before feeding by the resin feeder 4 is stopped.

To the CPU 27 are connected the screw drive unit 11, sensor 12 and pump 22.

The operation of the molder 1 having the above construction will now be described.

In the following description, the structure of the screw 7 in the resin feeder 4 and related structure of the screw 7 of the resin feeder 4 and sensor 12 are assumed to be those shown in FIG. 1. The same function can be obtained in the case of the screw 7 having the structure as shown in FIG. 2.

Also for this discussion, it is assumed that a red coloring agent is contained in the container 18 and that a resin material is accommodated in the hopper 2.

When a start switch (not shown) is depressed the CPU 27 drives the screw drive unit 11 according to one of the operation programs noted above. The screw 7 thus starts rotating in the cylinder 6 and sliding in the directions of arrows $X_1$ and $X_2$, thus starting the feeding of the resin material. With the rotation and sliding of the screw 7, the guide piece 13 and rack 16 also slide in the directions of arrows $X_1$ and $X_2$, and the rack 15 causes rotation of the pinion 16. With the rotation of the pinion 16 the potentiometer 17 supplies a detection signal corresponding to the displacement of the rack 15, i.e., displacement of the screw 7, to the CPU 27.

According to this detection signal, the CPU 27 controls the driving of the pump 22 according to one of the various operation programs noted above. More specifically, according to the detection signal the CPU 27 drives the pump 22 at a constant speed in synchronism with the start of rotation and sliding of the screw 7, thus causing the red coloring agent to be discharged from the discharge nozzle 23. This operation is continued during rotation and sliding of the screw 7.

Thus, the material resin and red coloring agent are supplied by the screw 7 to the head while they are mixed at a fixed rate. In the head, the colored resin is compressed and heated before being supplied to a die or the like for producing various molded products.

Further, in lieu of the above control of driving of the pump 22, the pump 22 may be controlled such that a predetermined quantity of the red coloring agent is discharged at a constant rate from the discharge nozzle 23 for a certain predetermined time period during the rotation and sliding of the screw 7.

With such state of discharge of the coloring agent, the colored resin fed out from the head is colored in red to a certain specific extent, and this allows the molded product to be provided with a color shade.

Further, the CPU 27 may select a program for driving the pump 22 after a lapse of a predetermined period of time (i.e., about several seconds) from the reception of the detection signal and control the driving of the pump 22 according to this program.

By adopting the above pump driving control, the material resin which is initially colorless, gradually becomes red, and eventually a uniformly red state can be obtained. It is thus possible to obtain fine color adjustments for the molded products.

Conversely, the CPU 27 can select a driving control so as to stop the pump 22 before the detection signal has vanished, i.e., about several seconds before the end of the rotation and sliding of the screw 7.

In this case, the color of a trailing portion of the colored resin is gradually changed from red to colorless. In this way, fine adjustments in the color of the products are possible.

In addition to the above various controls for driving of the pump 22, the CPU 27 can also effect control according to an operation program so as to cause reverse driving of the pump 22 to provide a suction force to the discharge nozzle at the end of discharge of the coloring agent. With this control, the useless coloring agent is not introduced into the material resin, and also it is possible to facilitate the changing of colors.

The above embodiment is by no means limiting and can be variously modified within the scope of the invention. For example, the coloring agent feeder 5 according to the invention is not limited in application to the resin molders shown in FIGS. 1 or 2 having the material resin feeder means, bracket and resin feeder, but it can find application in to a wide variety of resin molders.

As has been described in the foregoing, according to the invention it is possible to provide a molder, which can efficiently mix a material resin and a coloring agent to obtain a desirably colored resin and also to readily permit color alternations.

Further, it is possible to provide a molder which is free from leakage of an undesired coloring agent and permits the saving of the coloring agent and stringent control of the color of the colored resin.

Still further, it is possible to provide a molder which permits optimum proportions of the resin material resin and coloring agent to be mixed to molded products having desired colors at all times.

Yet further, it is possible to provide a molder, in which a predetermined quantity of a coloring agent can be supplied at a constant rate from the coloring agent supply means while the material resin is fed by the feeder means, thus permitting molded products having desired colors to be obtained.

Furthermore, it is possible to provide a molder, which can produce molded products having subtle color variations.

What is claimed is:

1. A colored resin molder comprising:
   an input member;
   material resin supply means for storing a resin material having thermoplastic properties and supplying the stored resin material through said input member;
   coloring agent supply means having a nozzle discharge end disposed in said input member for supplying a liquid coloring agent;
   feeding means for feeding the resin material from said resin material supply means while mixing the coloring agent with the resin material for resin molding;
   sensor means for detecting the status of feeding by said feeding means; and
   control means for controlling the operation of said coloring agent supply means according to the result of detection by said sensor means by providing a suction force to said nozzle discharge end of said coloring agent supply means when said sensor means detects a stationary state of said feeding means.

2. The colored resin molder according to claim 1, wherein said control means controls said coloring agent supply means to be driven in synchronism with a feeding status of said feeding means as detected by said sensor means.

3. The colored resin molder according to claim 1, wherein said control means controls said coloring agent supply means such that a predetermined quantity of the coloring agent is supplied at a constant rate during feeding of the resin material by said feeding means as detected by said sensor means.

4. The colored resin molder according to claim 1, wherein said control means is operable to cause feeding of the coloring agent by said coloring agent supply means to begin a predetermined period of time after said sensor means detects the start of operation of said feeding means.

* * * * *